(12) United States Patent
Feustel et al.

(10) Patent No.: US 7,218,828 B2
(45) Date of Patent: May 15, 2007

(54) OPTICAL FIBER POWER SPLITTER MODULE APPARATUS

(76) Inventors: Clay A. Feustel, 2041 Shadwell Way, Alpharetta, GA (US) 30022; Daniel Hendrickson, 3020 Darien Park Dr., Roswell, GA (US) 30076; Hongbo Zhang, 11470 Donnington Dr., Duluth, GA (US) 30097

(*) Notice: Subject to any disclaimer, the term of this patent is extended or adjusted under 35 U.S.C. 154(b) by 198 days.

(21) Appl. No.: 11/041,816

(22) Filed: Jan. 24, 2005

(65) Prior Publication Data

US 2006/0165366 A1    Jul. 27, 2006

(51) Int. Cl.
*G02B 6/00* (2006.01)

(52) U.S. Cl. .................... 385/135; 385/14; 385/31; 385/39; 385/53; 385/76; 385/134

(58) Field of Classification Search .................. 385/14, 385/31, 39, 53, 76, 134, 135, 137
See application file for complete search history.

(56) References Cited

U.S. PATENT DOCUMENTS

| | | | | |
|---|---|---|---|---|
| 6,163,639 A | * | 12/2000 | Ollier et al. | 385/52 |
| 6,542,652 B1 | * | 4/2003 | Mahony | 385/15 |
| 2005/0281526 A1 | * | 12/2005 | Vongseng et al. | 385/135 |

* cited by examiner

*Primary Examiner*—Frank G. Font
*Assistant Examiner*—Michael P. Mooney

(57) ABSTRACT

Embodiments of the invention include an optical power splitting module apparatus. The module apparatus includes at least one input port, one or more multi-fiber output ports, and an optical fiber-splitter device coupled therebetween. The optical splitter device has a first end configured as at least one single optical fiber, and a second end configured as one or more multi-fiber groups. The first end of the splitter device is coupled to the input port and the second end of the splitter device is coupled to the output ports. The first end of the splitter device is, e.g., an LC connector. The second end of the splitter device is, e.g., one or more Multi-fiber Push On (MPO) connectors. The optical splitter device is, e.g., a 1×N planar lightwave circuit (PLC) splitter, such as a 1×32 PLC splitter with an LC input connector and four 8-fiber MPO output connectors.

12 Claims, 3 Drawing Sheets

OPTICAL FIBER POWER SPLITTER MODULE APPARATUS

BACKGROUND OF THE INVENTION

1. Field of Invention

The invention relates to optical fiber power splitting devices. More particularly, the invention relates to modules for splitting optical power.

2. Description of Related Art

One of the most important recent developments in the field of fiber optic communications is the emergence of the feasibility of fiber management and distribution systems, arrangements and devices for delivering optical fiber signals to a particular location or group of locations. Such applications typically are referred to as Fiber To The x (FTTx) applications. One of the more popular FTTx applications is Fiber To The Premises (FTTP) or Fiber To The Home (FTTH), in which optical signal capabilities are routed from a central fiber office or other distribution location to a plurality of homes in that particular location via optical fiber and one or more optical connectors and/or other optical connection devices.

One type of optical fiber connector used in many Premise system configurations is the Multi-fiber Push On (MPO) connector. Also, MPO connectors are housed in modules for providing modular MPO connections and terminating and interconnecting MPO connector arrangements.

Various conventional FTTx products exist, including MPO-based connection devices. For example, such devices include the InstaPATCH™ MPO module and trunk cable design offerings by Systimax Solutions, Plug and Play offerings from Corning Cable Systems, and the fiber optic infrastructure products by Red Hawk CDT. Also, Blue Helix offers MPO modules and module patch panels for FTTx applications.

Conventionally, FTTx applications use planar lightwave circuit (PLC) technology in various packaging structures. Typically, these packaging structures include a splitter housing that splits a single optical fiber into a plurality of individual fiber pigtails emanating from the splitter housing. The fiber pigtails, which each typically are approximately 4 to 6 feet in length, are used to administer various fiber routing assignments within a fiber distribution location and/or between locations (e.g., outside plant administration points).

However, many of these packaging structures have as many as 32 fiber pigtails emanating therefore. With such a relatively large number of individual fiber pigtails, congestion and tangling of the fiber pigtails become concerns. Also, accurate routing of the fiber pigtails and general circuit administration and storage are issues with these types of packaging structures.

Accordingly, it would be desirable to have available a fiber connection module or other packaging structure that overcomes the aforementioned problems of conventional packaging structures.

SUMMARY OF THE INVENTION

The invention is embodied in an optical power splitting module apparatus. The module apparatus includes at least one input port, one or more multi-fiber output ports, and an optical fiber splitter device coupled between the input port and the multi-fiber output ports. The optical splitter device has a first end configured as at least one optical fiber, and a second end configured as one or more multi-fiber groups. The first end of the splitter device is coupled to the input port and the second end of the splitter device is coupled to the output ports. According to an embodiment of the invention, the first end of the splitter device includes at least one LC connector or other suitable optical connector. According to another embodiment of the invention, the second end of the splitter device includes one or more Multi-fiber Push On (MPO) connectors. The optical splitter device is, e.g., a 1×N planar lightwave circuit (PLC) splitter. In one arrangement, the optical splitter device is a 1×32 PLC splitter with an LC connector and four 8-fiber MPO output connectors.

DETAILED DESCRIPTION OF EXEMPLARY EMBODIMENTS

Figures 1, 2:
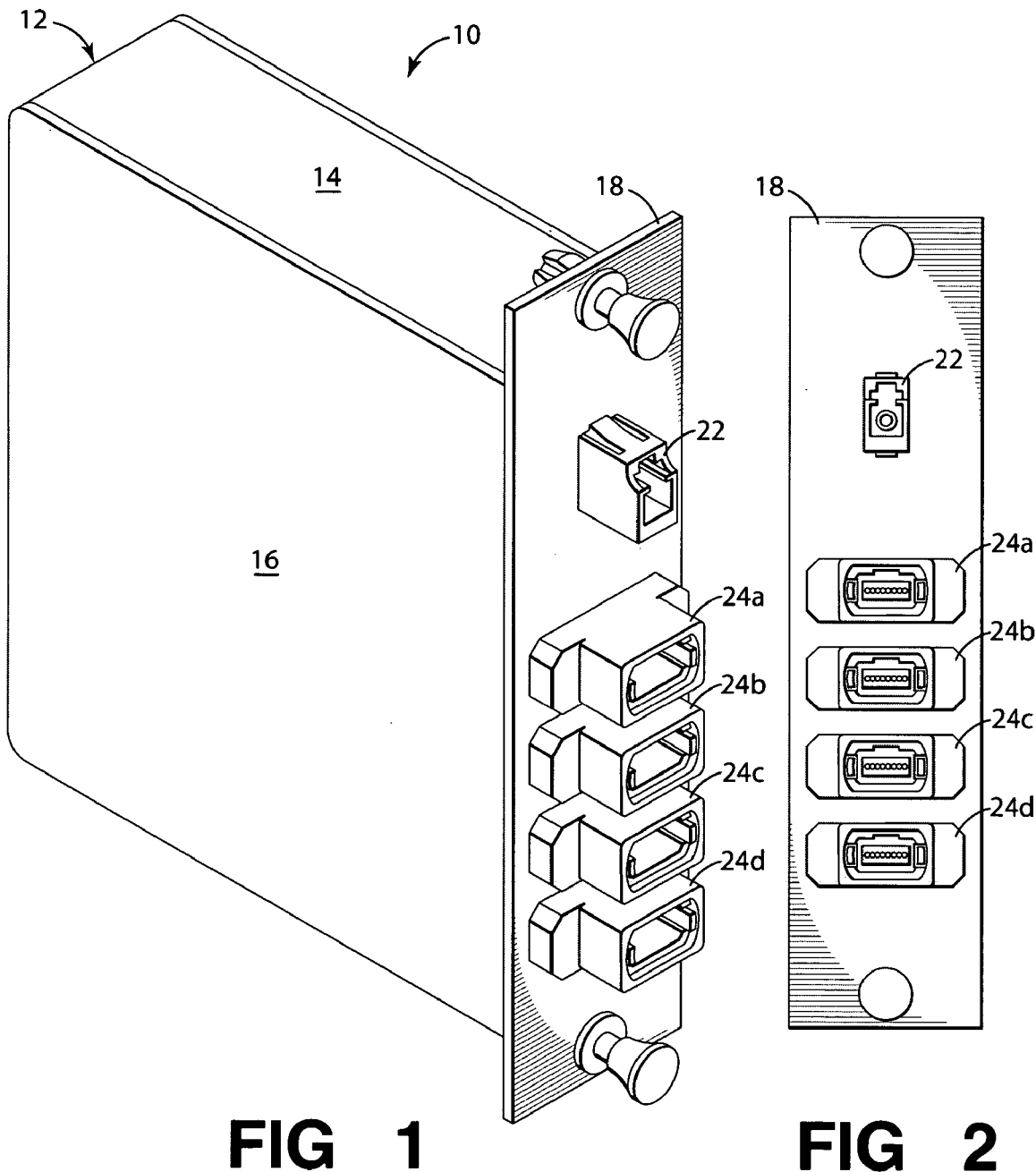
FIG. 1 is a simplified, perspective view of an optical fiber power splitter module apparatus according to embodiments of the invention.
FIG. 2 is a plan view of the front panel portion of the module apparatus of FIG. 1.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a simplified, perspective view of an optical fiber power splitter module apparatus 10 according to embodiments of the invention. The module apparatus 10 is dimensioned and configured for housing and appropriately coupling the components used in splitting optical power from at least one single input fiber to one or more multi-fiber groups, according to embodiments of the invention. Also, the module apparatus 10 is dimensioned and configured for use in various optical distribution arrangements. For example, the module apparatus 10 is useful for splitting optical power within the Fiber To The x (FTTx) optical radial distribution system, apparatus and method disclosed in detail in co-pending application Ser. No. 11/041,813, filed on even date herewith and assigned to the assignee of this application.

The module apparatus 10 has the necessary structure for packaging optical splitting components such as planar light circuit (PLC) splitting devices. For example, the module apparatus 10 includes a housing or body 12 having a top surface 14, an opposing bottom surface (not shown), a first side surface 16, an opposing second side surface (not shown), and a back surface (not shown). The module apparatus 10 also includes a module panel 18, which also is referred to as a front panel or a connection panel. The body 12 of the module apparatus 10 is made of any suitable material, e.g., formed sheet metal, molded plastics, and/or machined metal.

Referring now to FIG. 2, with continuing reference to FIG. 1, shown is a plan view of the module panel 18.

According to an embodiment of the invention, the module panel 18 has formed therein at least one input port 22 and one or more output ports 24, e.g., output port 24a, output port 24b, output port 24c, and output port 24d. Alternatively, the input port 22 is formed in one or more surfaces other than the module panel 18, e.g., the top surface 14, the bottom surface, the first side surface 16, the second side surface, and the back surface. Similarly, according to alternative embodiments of the invention, one or more of the output ports 24 are formed in one or more surfaces other than the module panel 18. In the embodiment of the invention shown in FIG. 2, the module apparatus 10 has any suitable number of input ports 22 and output ports 24, and is dimensioned and configured to have formed therein the appropriate number of input ports and output ports for the particular arrangement of components within the module apparatus 10.

The input port 22 comprises an optical fiber adapter or other appropriate device for coupling to an optical fiber connector, e.g., an LC connector. According to an embodiment of the invention, the input port 22 is an adapter configured to receive the plug end portion of an LC connector or other suitable optical fiber connector.

The module panel 18 also includes at least one output port 24. In the embodiment shown in FIG. 2, the module panel 18 includes four output ports (24a, 24b, 24c, 24d). However, the module panel 18 can include any suitable number of output ports 24. According to embodiments of the invention, at least one of the output ports is a multi-fiber optical fiber connector or appropriate coupling device for a multi-fiber optical fiber connector. For example, the output port 24a is an adapter configured to receive the plug end portion of a multi-fiber optical fiber connector, such as a Multi-Fiber Push-On (MPO) connector. However, according to embodiments of the invention, not all of the output ports 24 have to be compatible with multi-fiber optical fiber arrangements.

Figure 3:
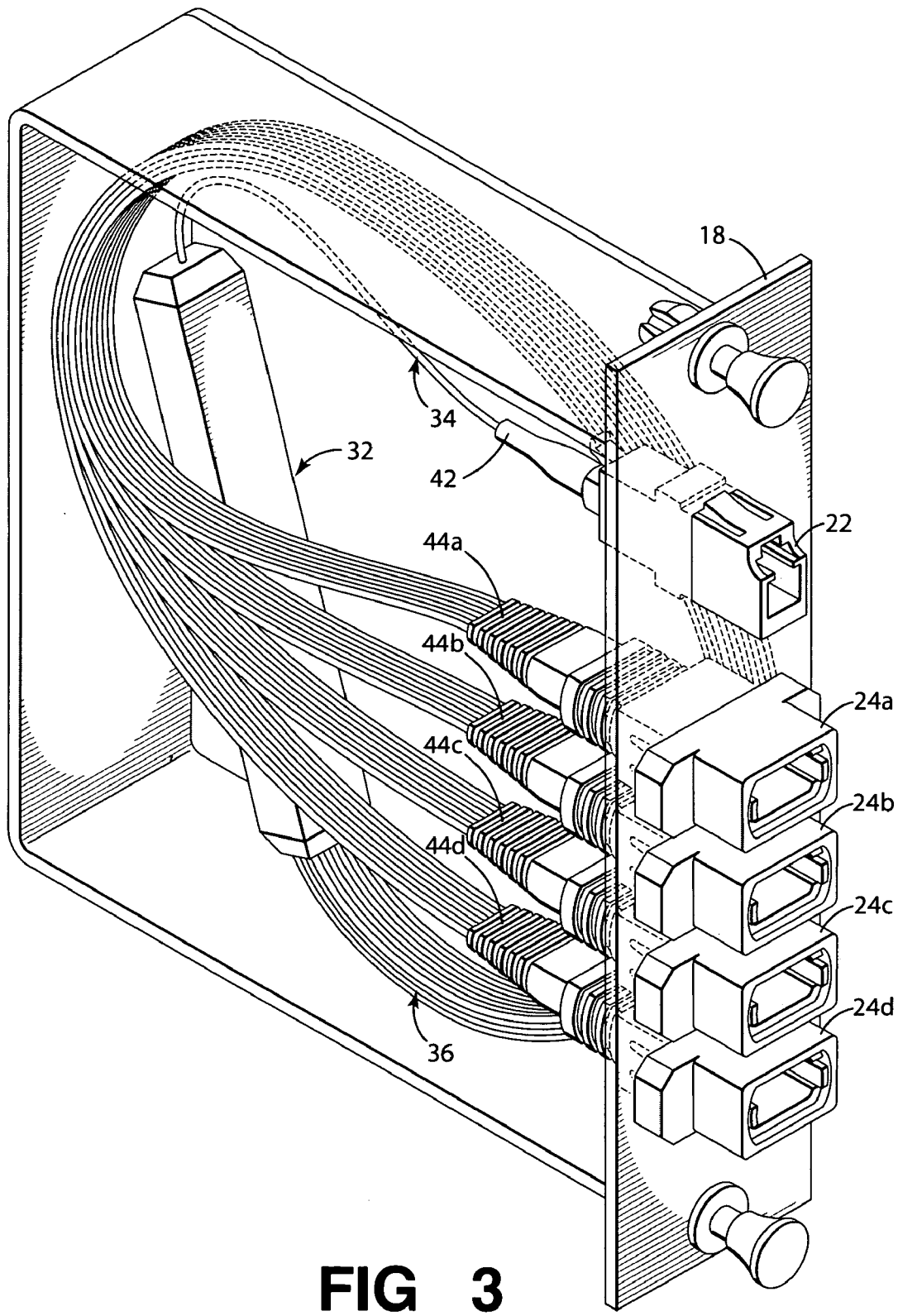
FIG. 3 is a partial, cross-sectional view of the module apparatus of FIG. 1, showing the interior of the module apparatus.
Figure 4:
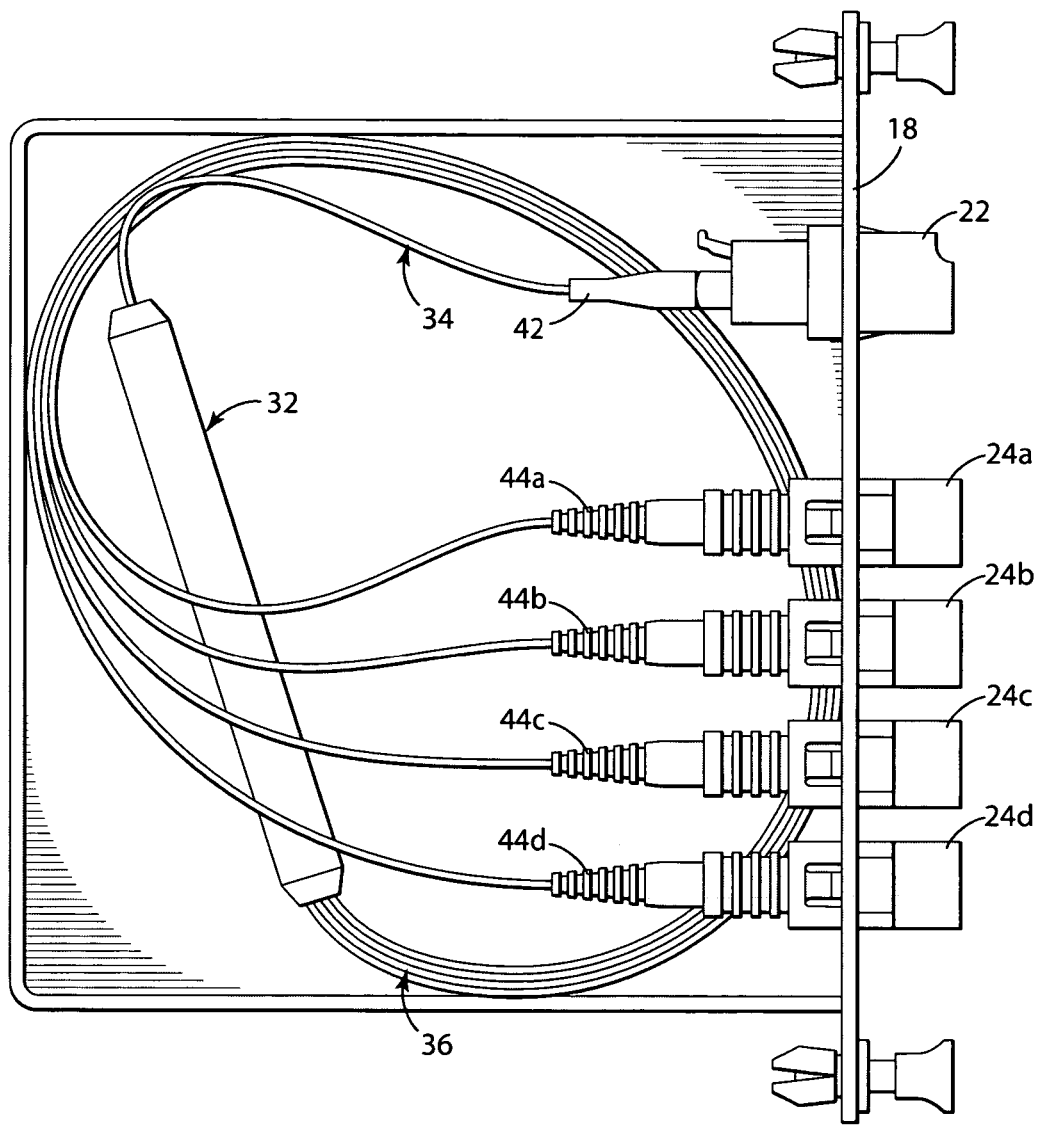
FIG. 4 is a side, plan view of the module apparatus, with the side panel removed to show the interior of the module apparatus.

Referring now to FIGS. 3 and 4, with continuing reference to FIGS. 1–2, shown is a partial, cross-sectional view (FIG. 3) and a side, plan view (FIG. 4) of the module apparatus 10, showing the interior of the module apparatus 10. As shown, the module apparatus 10 has an optical fiber splitter device 32 coupled between the input port 22 and the plurality of multi-fiber output ports 24. The splitter device 32 has a first end 34, configured as at least one single optical fiber, coupled to the input port 22. In the embodiment shown in FIGS. 3–4, the first end 34 has only one single optical fiber. Also, the splitter device 32 has a second end 36, configured as a plurality of multi-fiber groups, coupled to the corresponding output ports 24a-24d.

In the embodiment shown in FIGS. 3–4, the splitter device 32 is a 1×32 PLC splitter device with the first end 34 including an LC connector 42 or other suitable connector device, and the second end 36 including 48-fiber MPO connectors $44_a$, $44_b$, $44_c$, and $44_d$, or other suitable multi-fiber connector devices. Accordingly, in this embodiment, the input port 22 is configured as an LC adapter or other suitable coupler for receiving the LC connector 42 from the first end 34 of the splitter 32. Similarly, the output ports 24a–d are configured as MPO adapters or other suitable coupling devices for receiving the MPO connectors 44. However, according to embodiments of the invention, the connector coupled to the first end 34 of the splitter device 32 can be configured as any suitable input arrangement or configuration, and the second end 36 of the splitter device 32 can be configured as any suitable output arrangement or configuration. That is, the module apparatus 10 and its contents can be configured to be adaptable with any standardized connectors or connector adapters.

The module apparatus 10 is dimensioned to house the splitting device 32 in such a way that the splitting device 32 does not encounter any excessive bend radius issues. As shown, the module apparatus 10 allows for the input and output fibers of the splitter 32 to be routed between the input port 22 and the output ports 24 in such an arrangement that allows the fibers to maintain their appropriate bend radius, thus not contributing to signal loss.

Because the output ports 24a–d in the module apparatus 10 are configured to be multi-fiber connectors or to be coupled to multi-fiber connectors, the output ports 24a–d allow fibers subsequently connected to the output ports to remain bundled, e.g., as part of an MPO fanout arrangement. Thus, the fibers connected to the output ports 24a–d remain organized beyond conventional arrangements, which typically include individual fiber pigtails at the module output. According to embodiments of the invention, the particular multi-fiber group configuration of the output of the module apparatus 10 allows the splitting fiber structure to remain relatively bundled and more organized farther along the transmission paths, e.g., to the system administration point.

Compared to conventional optical fiber splitting arrangements, the module apparatus 10 has an overall reduced size. Also, the configuration of the module apparatus 10 makes it suitable for use with conventional MPO fanout assemblies, e.g., within an optical fiber splitting and distribution system. In this manner, the use of the module apparatus 10 and MPO fanout assemblies of the splitter device 32 reduces overall fiber congestion and alleviates much of the fiber tangle problem that typically exists in conventional optical fiber splitting arrangements. Also, the module apparatus 10 allows for system expansion in a more incremental manner than with conventional splitting arrangements. For example, the module apparatus 10 shown in FIGS. 1–4 allows for a plurality of MPO fanout assemblies, e.g., 4 MPO fanout assemblies having 8 pigtails each, or 32 pigtails, to be used therewith.

It will be apparent to those skilled in the art that many changes and substitutions can be made to the embodiments of the invention herein described without departing from the spirit and scope of the invention as defined by the appended claims and their full scope of equivalents. For example, the input ports and the output ports can be formed in different portions of the module body. That is, for example, the input port may be formed in the module panel or in the top surface or the side surface of the module body. Also, all or a portion of the output ports may be formed in the module panel or in the top, side, bottom or back surfaces of the module body.

The invention claimed is:

1. A module apparatus for splitting optical power, the module comprising:
   at least one input port configured for coupling to an optical fiber; and
   at least one multi-fiber output port, the output port configured for coupling to a plurality of optical fibers, wherein the at least one multi-fiber output port is a Multi-Fiber Push-On (MPO) connector,
   wherein the module apparatus is configured to couple an optical splitter between the input port and the plurality of output ports, the optical splitter having a first end configured as a single fiber and a second end coupled as a plurality of multi-fiber groups, wherein the first end is coupled to the input port and the second end is coupled to the plurality of multi-fiber output ports.

2. The module apparatus as recited in claim 1, wherein the input port further comprises a single fiber connector.

3. The module apparatus as recited in claim 1, wherein the input port is configured for coupling to a single fiber connector.

4. The module apparatus as recited in claim 1, wherein the input port further comprises an adapter configured for coupling a pair of single fiber connectors.

5. The module apparatus as recited in claim 1, wherein the at least one multi-fiber output port is configured for coupling to a Multi-Fiber Push-On (MPO) connector.

6. The module apparatus as recited in claim 1, wherein the at least one multi-fiber output port further comprises an adapter for coupling a pair of Multi-Fiber Push-On (MPO) connectors.

7. The module apparatus as recited in claim 1, wherein the at least one multi-fiber output port further comprises a plurality of multi-fiber output ports.

8. The module apparatus as recited in claim 1, wherein the optical splitter further comprises a 1×N fiber planar light circuit (PLC) splitter.

9. The module apparatus as recited in claim 1, wherein the optical splitter further comprises a 1×N fiber planar lightwave circuit (PLC) splitter, where N is a multiple of 8, and wherein the at least one multi-fiber output port further comprises a corresponding multiple of 8-fiber Multi-Fiber Push-On (MPO) connectors.

10. The module apparatus as recited in claim 1, wherein the optical splitter further comprises a 1×32 planar lightwave circuit (PLC) splitter, and wherein the at least one multi-fiber output port further comprises four 8-fiber Multi-Fiber Push-On (MPO) connectors.

11. A module apparatus for splitting optical power, the module comprising:
   at least one input port configured for coupling to an optical fiber; and
   at least one multi-fiber output port, the output port configured for coupling to a plurality of optical fibers, wherein the at least one multi-fiber output port is configured to interconnect at least one multi-fiber connector to the second end of the 1×N optical splitter.
   wherein the module apparatus is configured to couple an optical splitter between the input port and the plurality of output ports, the optical splitter having a first end configured as a single fiber and a second end coupled as a plurality of multi-fiber groups, wherein the first end is coupled to the input Port and the second end is coupled to the plurality of multi-fiber output ports.

12. The module apparatus as recited in claim 1, further comprising a module housing dimensioned to house the optical splitter, the module housing including a connection panel, wherein the input port and the at least one multi-fiber output port are coupled to the connection panel.

* * * * *